(12) United States Patent
Wheat et al.

(10) Patent No.: US 7,402,287 B2
(45) Date of Patent: *Jul. 22, 2008

(54) APPARATUS AND METHODS FOR PRODUCING HYDROGEN

(75) Inventors: W. Spencer Wheat, Missouri City, TX (US); Hongqiao Sun, Sugar Land, TX (US); Bhaskar Balasubramanian, Houston, TX (US); Vesna R. Mirkovic, Pearland, TX (US)

(73) Assignee: Texaco Inc., San Ramon, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/015,358

(22) Filed: Dec. 17, 2004

(65) Prior Publication Data

US 2008/0005963 A1    Jan. 10, 2008

(51) Int. Cl.
*F01N 3/28* (2006.01)
*B01J 8/00* (2006.01)
(52) U.S. Cl. .................. 422/105; 422/191; 422/193; 48/127.7; 48/76; 48/197 R; 95/96; 95/97; 95/125
(58) Field of Classification Search ............. 95/1, 95/16, 15, 19, 90, 96, 97; 48/61, 127.7, 76, 48/197 R; 422/191, 193, 105; 96/125
See application file for complete search history.

(56) References Cited

U.S. PATENT DOCUMENTS

| | | |
|---|---|---|
| 4,047,904 A | 9/1977 | Worrall |
| 4,140,495 A | 2/1979 | Pietruszewski |
| 4,238,204 A | 12/1980 | Perry |
| 4,323,370 A | 4/1982 | Leitgeb |
| 4,598,836 A | 7/1986 | Wessel |
| 4,690,695 A | 9/1987 | Doshi |
| 4,693,730 A | 9/1987 | Miller et al. |
| 4,725,293 A | 2/1988 | Gunderson |
| 4,857,086 A | 8/1989 | Kawai |
| 4,925,464 A | 5/1990 | Rabenau et al. |
| 4,927,434 A | 5/1990 | Cordes et al. |
| 4,995,889 A | 2/1991 | Abel et al. |
| 5,042,994 A | 8/1991 | Smolarek |
| 5,082,473 A * | 1/1992 | Keefer ............ 95/98 |

(Continued)

FOREIGN PATENT DOCUMENTS

WO    WO 2004/054013 A2    6/2004

*Primary Examiner*—N. Bhat
(74) *Attorney, Agent, or Firm*—Williams Morgan & Amerson; Frank C. Turner; Melissa Patangia

(57) ABSTRACT

An apparatus and method for producing hydrogen. The apparatus includes a fuel processor, a purification unit and a system controller. The controller determines a calculated flow of reformate from the fuel processor and operates the purification unit based on the calculated flow. The calculated flow is derived from a process model of the fuel processor and known feed(s) to the fuel processor. The calculated flow of reformate is used to control the flow of reformate to adsorbent beds within the purification unit and can be used to control other materials flows within the apparatus. Means for reducing fluctuations in the pressure and/or flow rate of reformate flowing from the fuel processor to the purification unit are also disclosed. The purity of the hydrogen produced can be maintained by adjusting the operation of the purification unit in response to changes in reformate composition, pressure and/or flow rate.

15 Claims, 3 Drawing Sheets

U.S. PATENT DOCUMENTS

| | | |
|---|---|---|
| 5,112,367 A | 5/1992 | Hill |
| 5,256,174 A | 10/1993 | Kai et al. |
| 5,258,056 A | 11/1993 | Shirley et al. |
| 5,435,836 A | 7/1995 | Anand et al. |
| 5,593,478 A | 1/1997 | Hill et al. |
| 5,632,804 A | 5/1997 | Schartz |
| 5,669,960 A | 9/1997 | Couche |
| 5,753,010 A | 5/1998 | Sircar et al. |
| 5,807,423 A | 9/1998 | Lemcoff et al. |
| 5,827,358 A | 10/1998 | Kulish et al. |
| 5,876,485 A | 3/1999 | Andreani |
| 5,917,135 A | 6/1999 | Michaels et al. |
| 6,056,804 A | 5/2000 | Keefer et al. |
| 6,063,161 A | 5/2000 | Keefer et al. |
| 6,270,556 B1 | 8/2001 | Rouge et al. |
| 6,273,936 B1 | 8/2001 | Barry et al. |
| 6,277,174 B1 | 8/2001 | Neu et al. |
| 6,372,026 B1 | 4/2002 | Takemasa et al. |
| 6,406,523 B1 | 6/2002 | Connor et al. |
| 6,432,176 B1 | 8/2002 | Klos et al. |
| 6,451,095 B1 | 9/2002 | Keefer et al. |
| 6,471,744 B1 | 10/2002 | Hill |
| 6,488,747 B1 | 12/2002 | Keefer et al. |
| 6,497,755 B2 | 12/2002 | Murdoch et al. |
| 6,533,846 B1 | 3/2003 | Keefer et al. |
| 6,544,316 B2 | 4/2003 | Baker et al. |
| 6,619,336 B2 | 9/2003 | Cohen et al. |
| 6,712,087 B2 | 3/2004 | Hill et al. |
| RE38,493 E | 4/2004 | Keefer et al. |
| 6,723,156 B2 | 4/2004 | Edlund et al. |
| 6,767,389 B2 | 7/2004 | Edlund et al. |
| 6,770,391 B2 | 8/2004 | Nelson et al. |
| 2002/0094310 A1 | 7/2002 | Krause et al. |
| 2003/0175564 A1 | 9/2003 | Mitlitsky et al. |
| 2004/0107831 A1 | 6/2004 | Graham et al. |
| 2004/0115504 A1 | 6/2004 | Moeller et al. |

* cited by examiner

APPARATUS AND METHODS FOR PRODUCING HYDROGEN

FIELD OF THE INVENTION

The present invention relates generally to the field of hydrogen production. The apparatus and methods of the present invention produce hydrogen by removing impurities from an intermediate reformate comprising hydrogen and one or more impurities through selective adsorption. The selective adsorption can be carried out in a pressure swing adsorption unit wherein the adsorption period is controlled and adjusted to achieve greater product purity. More specifically, the present invention relates to the integration and operation of a pressure swing adsorbent unit with a fuel processing unit to produce hydrogen.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of an infrastructure that can provide generation, storage and widespread distribution of hydrogen.

One way to overcome this difficulty is through distributed generation of hydrogen, such as through the use of fuel processors to convert hydrocarbon-based fuels to hydrogen-rich reformate. Fuel reforming processes, such as steam reforming, partial oxidation, and autothermal reforming, can be used to convert hydrocarbon-based fuels such as natural gas, LPG, gasoline, and diesel, into hydrogen-rich reformate at a site where hydrogen is needed. However, in addition to the desired hydrogen product, fuel reformers typically produce undesirable impurities that reduce the value of the reformed product. For instance, in a conventional steam reforming process, a hydrocarbon feed, such as methane, natural gas, propane, gasoline, naphtha, or diesel, is vaporized, mixed with steam, and passed over a steam reforming catalyst. The majority of the hydrocarbon feed is converted to a reformate mixture of hydrogen and impurities such as carbon monoxide and carbon dioxide. To reduce the carbon monoxide content, the reformate is typically subjected to a water-gas shift reaction wherein the carbon monoxide is reacted with steam to form carbon dioxide and hydrogen. After the shift reaction(s), additional purification steps may be utilized to bring the hydrogen purity to acceptable levels. These purification steps can include, but are not limited to, methanation, selective oxidation reactions, membrane separation techniques, and selective adsorption such as in temperature swing and/or pressure swing adsorption processes.

Gas separation by pressure swing adsorption (PSA) is achieved by coordinated pressure cycling over an adsorbent bed that preferentially adsorbs a more readily adsorbed component relative to a less readily adsorbed component of a mixture. In a conventional PSA device, two or more adsorbent beds are connected in alternating sequence by directional valving to pressure sources and sinks for establishing the changes of working pressure and flow direction. In another conventional PSA device, flows to and from adsorbent beds are controlled by a rotary distribution valve that is rotated to cycle the adsorbent beds through adsorption and regeneration phases. For instance, the separation of oxygen from air is a known application of such conventional PSA devices. However, in such applications the composition of the gas mixture, its pressure and/or flow rate are typically fixed and known. In contrast, the integration of a PSA device to a fuel processor that produces a product of varying composition, pressure and/or flow rate imposes challenges to the efficient operation of such a system.

SUMMARY OF THE INVENTION

In an aspect of the present invention an apparatus for producing hydrogen is provided. An apparatus of the present invention includes a fuel processor capable of producing a flow of intermediate reformate comprising hydrogen and an impurity. The intermediate reformate can have a variable composition, pressure and/or flow rate. The apparatus includes a purification unit disposed downstream of the fuel processor capable of removing impurity from the flow of intermediate reformate to produce a flow of hydrogen-enriched reformate. A controller is provided that is capable of determining a calculated flow of intermediate reformate to be produced by the fuel processor from a process model of the fuel processor. The controller is capable of operating the purification unit in response to the calculated flow of intermediate reformate.

In a process aspect of the present invention, a method for producing a hydrogen-enriched reformate is provided. The method includes the step of producing a flow of intermediate reformate comprising hydrogen and an impurity in a fuel processor. The intermediate reformate produced can have a variable composition, pressure and/or flow rate. Impurity is removed from the intermediate reformate to produce a flow of hydrogen-enriched reformate. A calculated flow of intermediate reformate to be produced by the fuel processor is determined from a process model of the fuel processor. The purification unit is operated in response to the calculated flow of intermediate reformate. The method can optionally include the steps of selecting a hydrogen-enriched reformate output and determining the calculated flow of intermediate reformate based on the selected hydrogen-enriched reformate output, or selecting one or more feeds to the fuel processor and determining the calculated flow of intermediate reformate in part from the selected feed(s).

BRIEF DESCRIPTION OF THE DRAWINGS

The invention may be understood by reference to the following description taken in conjunction with the accompanying drawings.

Figure 1:
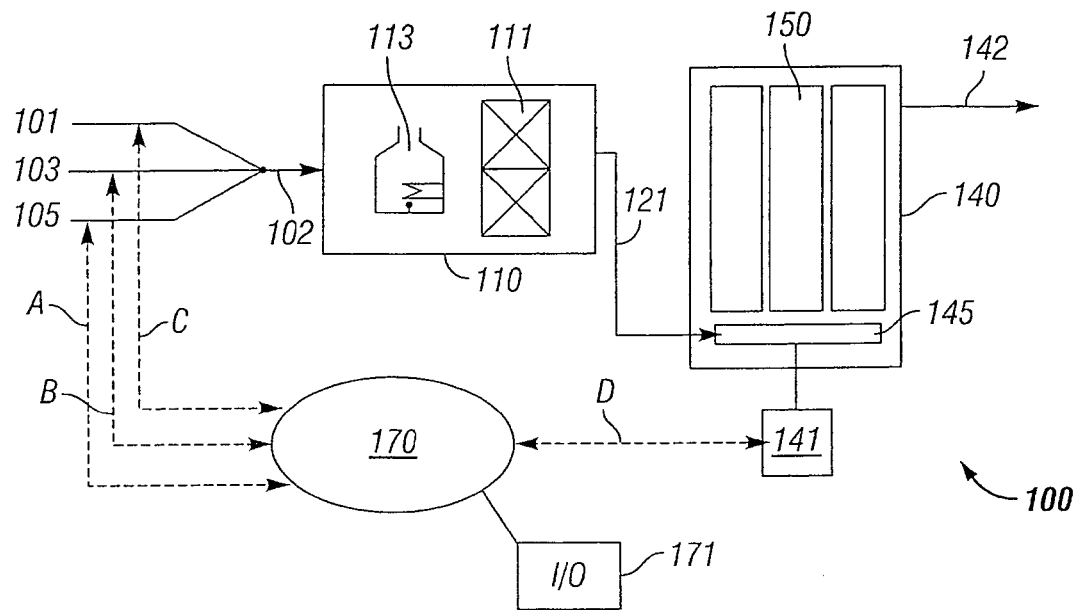
FIG. 1 is a schematic illustration of an embodiment of the present invention comprising a fuel processor and a purification unit.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The product stream from a fuel processor is typically rich in hydrogen but can contain one or more impurities such as carbon monoxide, carbon dioxide, water, steam, inert components such as nitrogen and argon, various sulfur and nitrogen-containing compounds as well as unreacted hydrocarbons. Such impurities must be removed or reduced to extremely low levels to render the hydrogen product safe and reliable. In addition, product streams from fuel processors can have fluctuations in composition, pressure and/or flow rate that can interfere with the purification and clean-up of the product. The present invention is directed to an apparatus and method for reducing or dampening such fluctuations and for adjusting the operation of a purification unit so as to maintain a desired product composition.

An apparatus of the present invention for producing hydrogen includes a fuel processor capable of producing a flow of intermediate reformate comprising hydrogen and an impurity. The flow of intermediate reformate can have fluctuations in composition, pressure and/or flow rate. Optionally, a compression unit can be disposed downstream of the fuel processor for receiving the flow of intermediate reformate and producing a flow of compressed intermediate reformate for delivery to a purification unit. A purification unit is provided downstream of the fuel processor for removing impurity from the flow of intermediate reformate to produce a hydrogen-enriched reformate. The purification unit has a plurality of adsorbent beds and a valve assembly for selectively controlling the flow of intermediate reformate to one or more of the plurality of adsorbent beds. A controller is included that is capable of determining a calculated flow of intermediate reformats to be produced by the fuel processor from a process model of the fuel processor. The controller is further capable of operating the purification unit in response to the calculated flow of intermediate reformate.

A fuel processor suitable for use in an apparatus of the present invention includes a device or apparatus that is capable of producing an intermediate reformats comprising hydrogen and one or more impurities. The ultimate objective of an apparatus of the present invention is to produce a substantially pure hydrogen product that can be used safely and reliably in any hydrogen-consuming device or process. As such, an "impurity" in this context includes any material that has the potential to foul, damage or otherwise interfere with the operation of hydrogen-consuming device or process or a hydrogen-storage device. Such impurities typically include sulfur-containing compounds, nitrogen-containing compounds, carbon oxides, liquid water, steam, unreacted hydrocarbons, and inert gases.

Figure 4:
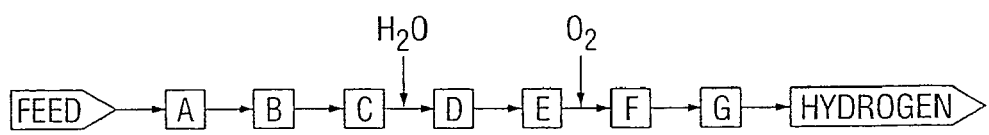
FIG. 4 is a block diagram illustrating a process flow within a fuel processor capable of producing an intermediate reformate.

In some embodiments, the fuel processor can include an oxidizer and reformer for converting a fuel to a reformate that comprises hydrogen and one or more impurities. Reformers are well known in the fuel processing art and can be designed to perform one or more of steam reforming, partial oxidation, and autothermal reforming among others. Although suitable fuel processors can utilize any known reformer, the following illustrative description associated with FIG. 4 is adapted from U.S. patent application Ser. No. 10/006,963, entitled "Compact Fuel Processor for Producing a Hydrogen Rich Gas," filed Dec. 5, 2001, in the name of Krause, et al., and published Jul. 18, 2002 (Publication No. US2002/0094310 A1), which describes a fuel processor for performing a combination of steam reforming and autothermal reforming.

As illustrated in FIG. 4, the feed to the fuel processor can include a hydrocarbon-based fuel, oxygen, water, and mixtures of the same. Hydrocarbon-based fuels suitable for use in the processor can include natural gas, LPG, gasoline, diesel, alcohols, and mixtures thereof. Natural gas is a preferred hydrocarbon-based fuel. Oxygen can be in the form of air, oxygen-enriched air, or substantially pure oxygen. Fuel(s) and water can be introduced as liquid and/or vapor. However, depending on the initial phase of the feed materials and the nature of the reforming reaction(s) some degree of feed preparation may be required. For instance, it is preferred that both liquid water and fuel(s) be converted to a gas phase, and further that reactants be pre-heated prior to their introduction into a reaction zone within the reformer. A metering device can be used to provide automated control over the flow of each of the feeds to the fuel processor and sensors can be used to provide feedback concerning the composition, pressure and/or flow rate of those feeds.

Block A of FIG. 4 represents a reforming step, in which, in one particular embodiment, two reactions, a partial oxidation (formula I, below) and a steam reforming (formula II, below), are performed to convert the feed into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \tag{I}$$

$$CH_4 + H_2O \rightarrow 3H_2 + CO \tag{II}$$

A higher concentration of oxygen in the feed stream favors the exothermic partial oxidation whereas a higher concentration of water vapor favors the endothermic steam reforming reaction. Therefore, the ratios of oxygen to hydrocarbon and water to hydrocarbon as well as the reaction temperature are characterizing parameters that affect hydrogen yield. The reaction temperature of reforming step A can range from about 550° C. to about 900° C., depending on the feed conditions and the catalyst. Examples of partial oxidation and steam reforming catalysts are well known in the fuel reforming art and are not described in detail.

Block B represents a cooling step wherein the synthesis gas stream from reforming step A is cooled to a temperature of from about 200° C. to about 600° C., and preferably from about 375° C. to about 425° C., to prepare the synthesis gas for process step C (discussed below). This cooling may be achieved with heat sinks, heat pipes, heat exchangers or the like depending upon the design specifications and the extent to which heat is to be recovered/recycled from the synthesis gas. Cooling of the synthesis gas can also be achieved by other means known in the art, e.g. injection of a lower temperature steam into the synthesis gas stream.

Block C represents a desulphurization step. An impurity of many fuels is sulfur, which is commonly converted to hydrogen sulfide during reforming step A. Desulfurization preferably utilizes zinc oxide and/or other material(s) capable of absorbing and converting the hydrogen sulfide, with or without a support (e.g., monolith, extrudate, pellet, etc.). Desulphurization can be accomplished by converting the hydrogen sulfide to zinc sulfide in accordance with the following reaction formula III:

$$H_2S + ZnO \rightarrow H_2O + ZnS \quad \text{(III)}$$

Desulfurization is preferably carried out at a temperature of from about 300° C. to about 500° C., and more preferably from about 375° C. to about 425° C.

The desulfurized process stream may then be sent to a mixing step D wherein water received from a water subsystem is optionally added. The addition of water serves the dual purposes of lowering the temperature of the process stream and of supplying additional water for use in the water gas shift reaction to follow. The water vapor and other stream components are mixed by being passed through a stage of inert materials such as ceramic beads or other similar materials that effectively mix and/or assist in the vaporization of water. Alternatively, additional water can be introduced prior to reforming step A and the mixing step can be repositioned or eliminated. Where the process stream is to be subjected to a selective oxidation, a mixing step may also be utilized to mix an oxidant with the process stream prior to oxidation.

Block E represents a water gas shift reaction step that converts carbon monoxide to carbon dioxide in accordance with formula IV:

$$H_2O + CO \rightarrow H_2 + CO_2 \quad \text{(IV)}$$

Generally, the water gas shift reaction can take place at temperatures ranging from 150° C. to 600° C. depending on the catalyst. Under such conditions, much of the carbon monoxide in the gas stream is converted to carbon dioxide. Where the hydrogen-enriched reformate is to be used as a fuel for fuel cells, the concentration of carbon monoxide needs to be lowered to a level that can be tolerated by fuel cell catalyst(s), typically below about 50 ppm. Examples of water gas shift catalysts, both low and high temperature catalysts, are well known in the fuel reforming art and are not set forth in detail herein.

Block F represents a cooling step that can be performed in an inert stage or otherwise to reduce the temperature of the process stream to a temperature preferably in the range of from about 90° C. to about 150° C. When the cooling step F is to be followed by a selective or preferential oxidation step, oxygen from an air subsystem can also be added to the process stream.

Block G represents an optional selective or preferential oxidation step wherein much of the remaining carbon monoxide in the process stream is converted to carbon dioxide. Although this oxidation is carried out in the presence of a catalyst having activity for oxidizing carbon monoxide, two reactions typically occur, namely, a desirable oxidation of carbon monoxide (formula V) and an undesirable oxidation of hydrogen (formula VI).

$$CO + \tfrac{1}{2}O_2 \rightarrow CO_2 \quad \text{(V)}$$

$$H_2 + \tfrac{1}{2}O_2 \rightarrow H_2O \quad \text{(VI)}$$

Since both reactions produce heat and because the preferred oxidation of carbon monoxide is favored by low temperatures, it may be advantageous to optionally include a cooling element such as a cooling coil within an oxidation reaction zone. The oxidation reaction temperature is preferably kept in the range of from about 90° C. to about 150° C. Because an apparatus of the present invention comprises a purification unit such as a pressure swing adsorption unit for separating hydrogen from impurities, the use of selective oxidation step G may be omitted.

As noted herein, the intermediate reformate produced by a fuel processor is rich in hydrogen but can contain one or more impurities, and thus, must be subjected to purification or clean-up to remove or reduce such impurities to extremely low levels. Depending on the nature of the purification technique to be used, the pressure of the intermediate reformate may need to be increased prior to delivery to the purification unit. Therefore, an apparatus of the present invention can optionally include a compression unit downstream of the fuel processor for receiving a flow of intermediate reformate and producing a flow of compressed intermediate reformats. In some embodiments, such as where the hydrogen-enriched reformate exiting the purification unit is destined for a storage at elevated pressure, a second compression unit can optionally be disposed intermediate the purification unit and a storage unit for increasing the pressure of the hydrogen-enriched reformate to the appropriate level.

Compression units are known in the art for compressing mixtures of gases containing hydrogen prior to subjecting the mixtures to separation techniques and/or storage. A more detailed description of such compression technologies can be found in chemical engineering references such as Perry's Chemical Engineers' Handbook, 4$^{th}$ Ed. (McGraw-Hill, ©1963), and in the patent literature such as in U.S. Pat. No. 4,690,695 issued Sep. 1, 1987 to Doshi; U.S. Pat. No. 6,488,747 issued Dec. 3, 2002 to Keefer et al.; and U.S. Application Publication No. US 2003/0175564 A1 published Sep. 18, 2003 by Mitlitsky et al., the descriptions of which are incorporated by reference. While the compression unit need not be described in exacting detail, it should be recognized that a suitable compression unit can comprise a compressor driven by a fixed or variable speed motor in a single stage or two or more compressors in a multi-stage compression unit. Further, suitable compression units can include axial, centrifugal, reciprocating, rotary-type compressors and combinations of the same.

The pressures that the compression unit should be capable of imposing on a fluid will depend on the pressure requirements of the unit for which compression is needed. In the case of a purification unit comprising a pressure swing adsorption unit ("PSA"), the pressure required of the flow of intermediate reformate to the PSA can vary between about 1 psig and about 600 psig. Where compression is needed to facilitate storage of the hydrogen-enriched reformate, the required pressure of the hydrogen-enriched reformate can vary from just above zero to more than 10,000 psig. One skilled in the art will appreciate that the selection of a suitable compression unit will be based on such factors as the composition of the intermediate reformate, its flow rate, pressure and temperature, the pressure requirements of the downstream unit(s), as well as factors such as the compression unit's power consumption, serviceability and cost.

In an embodiment wherein the purification unit comprises a pressure swing adsorption unit, the flow of intermediate reformate to a plurality of adsorbent beds within the PSA and the adsorption period during which impurities are adsorbed from a flow of intermediate reformate through the adsorbent beds are controlled in a manner that is independent of the speed of a compressor(s). More specifically, where the purification unit comprises a rotary-type PSA having a rotary distribution valve for controlling the material flows to the adsorbent beds, the rotary distribution valve is preferably operated independently of the speed of a compressor(s). In such embodiments, the compression unit preferably comprises a fixed speed compressor.

In embodiments where the compression unit comprises a compressor driven by a fixed speed motor or an induction motor, care should be taken during start-up when the compressor is first energized to ensure that sufficient fluid is present at the inlet of the compressor to prevent the formation of a vacuum. Similar care should also be exercised during shut-down and during transients of the fuel processor such as prior to resuming hydrogen production from stand-by status. As an alternative to assuring the presence of sufficient fluid, the speed of the compressor motor can be regulated by adjusting the power applied to the compression unit and the compressor motor. Suitable means for regulating the power can include a variable frequency drive for adjusting the line frequency applied to the motor, a soft start device for varying the voltage applied to the motor, and other means known in the art for regulating the power applied to the motor.

As noted herein, the composition of intermediate reformate from the fuel processor can exhibit fluctuations or variations in pressure and/or flow rate. Thus, an apparatus of the present invention can optionally include means for reducing or eliminating such fluctuations before they reach the downstream purification unit. As used herein, "reducing fluctuations in pressure and/or flow rate" is intended to refer to reductions in either the size or number of fluctuations in the pressure and/or flow rate of the intermediate reformate that is destined for the purification unit. Moreover, such means can also be employed to prevent the formation of a vacuum at the inlet of the compression unit within the line(s) carrying intermediate reformate to the compression unit.

Means for reducing fluctuations in the intermediate reformate can comprise a buffer disposed intermediate the fuel processor and the purification unit. Although such a buffer could be disposed at any location intermediate the fuel processor and the purification unit, it is preferably disposed upstream from a compression unit when present so that a more uniform flow of intermediate reformate is provided to an inlet of the compression unit. Those skilled in the art will appreciate that such a buffer will have sufficient volume to receive a variable flow of intermediate reformate from the fuel processor while releasing a more uniform flow to the purification unit. Moreover, in an embodiment where the buffer is disposed upstream from the compression unit, the flow of intermediate reformate from the buffer should be sufficient to prevent a vacuum from forming at the compression unit inlet during both start-up and steady state operations.

In embodiments where a compression unit is disposed intermediate the fuel processor and the purification unit, the means for reducing fluctuations in the pressure and/or flow rate of the intermediate reformate can comprise a conduit for providing a controlled flow of a supplemental fluid to an inlet of a compression unit. The supplemental fluid can include a compressed flow of intermediate reformate derived from an outlet of the compression unit, a hydrogen-enriched reformate derived from the purification unit, or some mixture thereof. The conduit has an outlet that directs the supplemental fluid into a line carrying intermediate reformate from the fuel processor to the compression unit. The number and location of conduit inlets are determined by the composition of the supplemental fluid. Where the supplemental fluid includes a compressed intermediate reformate, the conduit has an inlet intermediate the compression unit and the purification unit. Where the supplemental fluid includes a hydrogen-enriched reformate, the conduit has an inlet downstream from an outlet of the purification unit. In such an embodiment, the purification unit can include a first outlet for directing a hydrogen-enriched reformate and a second outlet for directing a hydrogen-depleted product out of the purification unit with the inlet of the conduit in fluid communication with the first outlet of the purification unit. Moreover, the conduit can have a variable-opening valve for controlling the flow of supplemental fluid therethrough. The variable-opening valve can be operated in response to the calculated flow of intermediate reformate, or when a sensor is present for sensing fluid(s) flowing from the fuel processor, e.g. intermediate reformate, supplemental fluid(s) etc., the variable-opening valve can be operated in response to sensed data.

An apparatus of the present invention includes a purification unit disposed downstream of the fuel processor that receives a flow of intermediate reformate and produces a flow of hydrogen-enriched reformate by removing impurity therefrom. Hydrogen can be separated from the impurities in the intermediate reformate using a variety of technologies. By way of example, a number of purification processes separate hydrogen from impurities through selective adsorption by passing the hydrogen-containing stream under pressure through a column or bed of adsorbent material. Selective adsorption can be performed with adsorptive materials that adsorb hydrogen and allow a hydrogen-depleted stream to pass or with materials that adsorb impurity and allow a hydrogen-enriched stream to pass. In either case, it is highly preferred that the adsorbent materials be capable of regeneration through techniques such as pressure swing, temperature swing and the like. In some embodiments, purification is carried out in a PSA unit having adsorptive materials that selectively adsorb impurities and allow a hydrogen-enriched reformate to pass.

The purification unit comprises a plurality of adsorbent beds, each of which is capable of removing one or more impurities from an intermediate reformate flowing through the bed. An adsorbent bed can include a vessel for housing adsorbent material(s). The adsorbent materials can take a variety of forms including packed beds of agglomerates, pellets, particles, and/or beads, monolithic structures, as well as various supports coated with adsorbent materials, e.g. coated sheets. In some embodiments, the adsorbent materials are provided as a packed bed having multiple layers of different adsorbent materials and/or mixtures of different adsorbent materials. In other embodiments, the adsorbent bed comprises a coated monolith or other structure configured to provide fluid pathways through the bed. Adsorbent materials suitable for use in the plurality of beds of the purification unit will depend on the materials to be adsorbed and removed from the process stream. By way of example, adsorbent materials known for use in removing water vapor, carbon dioxide and hydrocarbons can include alumina gels, activated carbon, silica gels and zeolites Moreover, zeolites such as low silica X zeolite and calcium or strontium exchanged chabazite are known for removing carbon monoxide and nitrogen.

The terminology "adsorption period" is used herein to refer to the period or the length of time that a flow of intermediate or compressed intermediate reformate is directed through an adsorbent bed for purposes of removing impurity. At the conclusion of an adsorption period, the flow of intermediate reformate through a first adsorbent bed is interrupted and the flow is re-directed to a second adsorbent bed so as to continue the removal of impurity and the production of hydrogen-enriched reformate while enabling the first adsorbent bed to be regenerated. It is envisioned that two or more adsorption beds will be operated in an adsorption phase while the other adsorption beds are undergoing various stages of regeneration. Moreover, suitable purification units will include those that are capable of adjusting and manipulating the adsorption period so as to compensate for fluctuations in the composition, pressure and/or flow rate of an intermediate reformate that is fed to the unit. The manner in which the adsorption period can be adjusted for purposes of achieving a hydrogen-enriched reformate depends on the type and structure of the purification unit selected.

In some embodiments, the purification unit comprises a pressure swing adsorption unit. Suitable PSA units include those known in the art for separating hydrogen from a process stream, such as are described in U.S. Pat. No. 4,238,204 issued Dec. 9, 1980 to Perry; U.S. Pat. No. 4,690,695 issued Sep. 1, 1987 to Doshi; U.S. Pat. No. 5,256,174 issued Oct. 26, 1993 to Kai et al.; U.S. Pat. No. 5,435,836 issued Jul. 25, 1995 to Anand et al.; U.S. Pat. No. 5,669,960 issued Sep. 23, 1997 to Couche; U.S. Pat. No. 5,753,010 issued May 19, 1998 to Sircar et al.; and U.S. Pat. No. 6,471,744 issued Oct. 29, 2002 to Hill, the descriptions of which are incorporated herein by reference. In some embodiments, the purification unit will comprise a compact PSA. Suitable compact PSAs can include a rotary-type PSA such as are described in U.S. Pat. No. 6,063,161 issued May 16, 2000 to Keefer et al. and in U.S. Pat. No. 6,406,523 issued Jun. 18, 2002 to Connor et al., the descriptions of which are incorporated herein by reference. Compact PSAs having rotary elements are commercially available from Questair Technologies, Inc. of Burnaby, Canada. Questair's rotary-type PSA, model series number H3200, were used in the development of the present invention.

The purification unit optionally but preferably includes a valve assembly that is capable of selectively controlling the flow of the intermediate reformate to one or more of the plurality of adsorbent beds. The valve assembly can comprise single or multiple valves having fixed or variable openings that are opened and closed to control material flows to the adsorbent beds. The valve assembly is capable of providing control over the flow of intermediate reformate to the adsorbent beds by selectively controlling which adsorbent bed(s) receive a flow of intermediate reformate and by controlling the sequence in which different materials are directed through an adsorbent bed. As such, the configuration of the valve assembly provides control over both the adsorption period and regeneration phases of each adsorbent bed. Depending on the nature of the adsorbent materials within the beds, regeneration can comprise imposing pressure and/or temperature swings, directing various materials through the bed and the like.

In an embodiment where the purification unit comprises a rotary-type PSA, rotation is created between the valve assembly and the plurality of adsorbent beds or inlets to the adsorbent beds so as to cycle each of the plurality of beds through adsorption-regeneration cycles. Valve assemblies for use in rotary-type PSAs are described in U.S. Pat. No. 4,925,464 issued May 15, 1990 to Rabenau et al.; U.S. Pat. No. 5,593,478 issued Jan. 14, 1997 to Hill et al.; U.S. Pat. No. 5,807,423 issued Sep. 15, 1998 to Lemcoff et al.; U.S. Pat. No. 6,056,804 issued May 2, 2000 to Keefer et al.; U.S. Pat. No. 6,372,026 B1 issued Apr. 16, 2002 to Takemasa et al.; U.S. Pat. No. 6,451,095 issued Sep. 17, 2002 to Keefer et al.; and U.S. Pat. No. 6,712,087 issued Mar. 30, 2004 to Hill et al., the descriptions of which are incorporated by reference. Rotation between the valve assembly and the adsorbent beds is preferably created by a variable-speed motor. Whereas the valve assembly controls the sequence of operations for each phase of the plurality of beds, the variable speed motor controls the length of each of those operations and the frequency at which the operations change. By adjusting the speed of such a motor, the adsorption period for each of the plurality of beds can be increased or decreased. Moreover, such changes in speed alter the frequency at which the flow of intermediate reformate is switched from a first adsorbent bed to a second adsorbent bed.

An apparatus of the present invention can optionally include a product sensor disposed downstream from the purification unit that is capable of sensing the hydrogen-enriched reformate and/or a hydrogen-depleted product and generating sensed product data therefrom. The sensed product data generated by the product sensor can be relayed or communicated to the controller, described below, for use in operating the purification unit. Preferably, the product sensor is disposed downstream and proximate to an outlet of the purification unit so that changes in the hydrogen-enriched reformate and/or the hydrogen-depleted reformate are detected quickly and compensating action can be taken. Where an optional tank is disposed downstream of the purification unit for receiving and storing a hydrogen-enriched reformate, the product sensor is disposed upstream from the tank so that off-specification reformate can be detected and diverted before it is received by the tank.

Sensed product data can comprise one or more of temperature, pressure, density, flow rate and compositional data. The product sensor preferably comprises a gas sensor. The type of sensor selected is determined by the nature of the data that needed. In some embodiments, the product sensor can comprise a compositional-type sensor for determining the concentration of a component within the hydrogen-enriched reformate and/or the hydrogen-depleted reformate. For instance, sensors for detecting the presence or concentration of carbon monoxide, carbon dioxide, hydrocarbons, water, sulfur-containing compounds, and nitrogen-containing compounds are commercially available. In an embodiment where the product sensor comprises a sensor for sensing compositional data, the sensor is preferably not suitable for sensing the concentration of free oxygen in the hydrogen-enriched reformate and/or the hydrogen-depleted reformate.

In an embodiment where data relating to the concentration of hydrogen in the hydrogen-enriched reformate is needed, the sensor can comprise a sensor capable of directly sensing the hydrogen concentration, or one or more sensors capable of sensing data from which the hydrogen concentration may be determined. A description of a method and apparatus for indirectly determining the hydrogen concentration of a reformate fed to a fuel cell can be found in U.S. Pat. No. 6,770,391 B2, issued Aug. 3, 2004 to Nelson et al., the disclosure of which is incorporated herein by reference. The concentration of hydrogen in the hydrogen-enriched reformate exiting the purification unit should be greater than about 99.96%, preferably greater than about 99.97%, and more preferably greater than about 99.98% by vol. When the sensed product data relayed to the controller indicates that the concentration of hydrogen is decreasing, the purification unit can increase the frequency at which the flow of intermediate reformate is directed from one adsorbent bed to the next. More specifically, where the purification unit is a rotary-type PSA unit having a variable-speed motor, the speed of the variable-speed motor can be increased to shorten the adsorption period. Similarly, where the sensed product data indicates that the pressure and/or flow-rate of the hydrogen-enriched reformate is increasing, the speed of the variable-speed motor can be increased to shorten the adsorption period and maintain a desired concentration of hydrogen in the hydrogen-enriched reformate.

As noted above, an apparatus of the present invention includes a system controller for monitoring and controlling the operation of the fuel processor and purification unit. As described below, the controller is capable of determining a calculated flow of intermediate reformate to be produced by the fuel processor and of operating the purification unit in response to the calculated flow of intermediate product.

The purification unit, when in the form of a pressure swing adsorption unit, can deliver a hydrogen-enriched reformate at constant composition provided that the flow rate of the intermediate reformate, the pressure, and the cycle times of the PSA, e.g. adsorption, desorption, pressure equalization, repressurization, blowdown, purge sequences etc., cumulatively referred to as "cycle times", all remain constant. If any of these parameters should change, the composition of the hydrogen-enriched reformate will also change. Because of changes in demand and other factors, the flow of intermediate product from the fuel processor to the PSA will vary from time to time. Therefore, at a given pressure, the operation of the PSA may need to be adjusted in response to changes in the flow of intermediate reformate in order to maintain the composition of the hydrogen-enriched reformate. Operation of the purification unit to maintain a constant composition requires essentially "real-time" knowledge of the flow rate and composition of the flow of intermediate reformate from the fuel processor. However, measurement of the flow of intermediate reformate can be difficult and require expensive analytical instrumentation. Further, because of long lag times, actual measurements may not provide reliable or usable data.

In an apparatus and method of the present invention, tThe technique used to control the operation of the purification unit is based on a predicted or calculated flow of intermediate reformate to be produced by the fuel processor. This calculated flow of intermediate reformate is determined by the controller from a process model of the fuel processor. The process model is initially developed from the chemical reactions that are performed on the feeds and process streams within the fuel processor. Reaction conversions and compositions can be determined from kinetic data available in the literature, and commercial modeling software such as is available from Aspen Technology, Inc. of Cambridge, Mass., can be used to develop a generalized process model for the fuel processor. However, a suitable model must be specific to the fuel processor that is used to produce the intermediate reformate. Therefore, to obtain a more accurate and complete model, elements specific to the fuel processor that impact the kinetic and thermodynamic properties of the fuel processor should also be included. Such elements can include the reactor materials and geometries, catalysts and other materials disposed in the path of the process stream, and the thermal features particular to the fuel processor design. Moreover, kinetic models based on experimental results can be used to estimate reaction conversions and compositions to be produced by the fuel processor and to determine optimum oxygen to carbon and steam to carbon ratios for given pressures and temperatures. In addition, the reformer's temperature profile that will result from a given set of feeds at a given pressure can be calculated as the adiabatic temperature rise resulting from minimizing the free energy of the reforming reaction(s).

When developed, the process model is capable of predicting, at steady state and a given pressure, the composition and flow rate of the intermediate product that is to be produced from a known feed to the fuel processor. Similarly, where the intermediate reformate is to have a given composition and flow rate, the model can determine the feeds that are needed to produce that intermediate reformate. The process model should also address the dynamic operations of the fuel processor, e.g., start-up, shut-down, turndowns and other transients.

In some embodiments, the controller can also include means for correlating the operation of the purification unit at a given pressure with a calculated flow of intermediate reformate that will produce a hydrogen-enriched reformate having a desired composition and/or flow rate. Such means can include a process model of the purification unit that is capable of determining the operational settings of the purification unit, e.g., the adsorption period or other cycle times, for producing a given hydrogen-enriched reformate. In an alternative, such means can include a set of empirical correlations determined experimentally that are stored, preferably in table form, for access by the controller. Regardless of the means used, for a given pressure and calculated flow of intermediate reformate, the means will provide the controller with instructions for operating the purification unit to produce a hydrogen-enriched reformate having a selected composition. In an embodiment where the purification unit is a rotary-type PSA having a variable speed motor, the means for correlating can include a look-up table wherein calculated flows of intermediate reformate at various pressures are correlated with various motor speeds that will produce a hydrogen-enriched reformate of a given composition. As a result, changes that may occur in the composition or flow rate of the calculated flow of intermediate reformate can be used to identify the appropriate change in motor speed that will adjust the operation of the purification unit so as to maintain the composition of the hydrogen-enriched reformate. Moreover, such means can be used to determine the calculated flow of intermediate reformate from a selected hydrogen-enriched reformate output.

In operation, an operator can select a hydrogen-enriched reformate output to be produced by the hydrogen producing apparatus. The selection of this output can comprise instructing the controller to produce a hydrogen-enriched reformate of a given quality or composition at a given flow rate. The controller can determine the calculated flow of intermediate reformate to be produced by the fuel processor from a look-up table based on the selected hydrogen-enriched reformate output. The controller can then set and adjust the feed(s) to the fuel processor to produce a flow of intermediate reformate based on the process model and the calculated flow of intermediate reformate. When the fuel processor reaches a steady state, the flow of intermediate reformate is directed to the purification unit. The controller operates the purification unit in response to the calculated flow of intermediate reformate to produce the hydrogen-enriched reformate. Where changes occur in the composition and/or flow rate of the intermediate product, the controller can adjust the operation of the purification unit, e.g., the adsorption period, to maintain the composition of the hydrogen-enriched reformate. Optionally, the controller can receive sensed product data for the hydrogen-enriched reformate that is exiting the purification unit and adjust the operation of the purification unit to achieve the operator selected reformate composition and flow rate.

In some embodiments, the controller is implemented on a single computing system for controlling each facet of the operation of the apparatus that is not under manual control. In other embodiments, the system controller can comprise multiple computing systems, each for controlling some designated facet of the operation of the apparatus. The system controller can be rack-mounted or implemented as a desktop personal computer, a workstation, a notebook or laptop computer, an embedded processor, or the like. Indeed, this aspect of any given implementation is not material to the practice of the invention.

The computing system preferably includes a processor communicating with memory storage over a bus system. The memory storage can include a hard disk and/or random access memory ("RAM") and/or removable storage such as a floppy magnetic disk and/or an optical disk. The memory storage is encoded with a data structure for storing acquired data, an operating system, user interface software, and an application. The user interface software, in conjunction with a display, implements a user interface. The user interface can include peripheral I/O devices such as a key pad or keyboard, mouse, or joystick. The processor runs under the control of the operating system, which may be practically any operating system known to the art. The application is invoked by the operating system upon power up, reset, or both, depending on the implementation of the operating system.

Software implemented aspects of the invention are typically encoded on some form of program storage medium or implemented over some type of transmission medium. The transmission medium may be twisted wire pairs, coaxial cable, optical fiber, or some other suitable transmission medium known to the art. Some portions of the detailed descriptions herein are presented in terms of a software implemented process involving symbolic representations of operations on data bits within a memory in a computing system. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, data, elements, symbols, instructions, characters, terms, numbers, or the like. It should be borne in mind, however, that all of these and similar terms are to be associated with the appropriate physical quantities and are merely convenient labels applied to these quantities. Furthermore, the actions and processes of an electronic device that manipulates and transforms data represented as physical (electronic, magnetic, or optical) quantities within some electronic device's storage into other data similarly represented as physical quantities have been denoted by terms such as "processing," "computing," "calculating," "comparing," "determining," "displaying," and the like.

An apparatus of the present invention can also optionally include a product valve disposed downstream of the purification unit for use in controlling a flow of hydrogen-enriched reformate and/or hydrogen-depleted reformate from the purification unit. In some embodiments, the product valve is a variable-opening valve. The product valve can be operated by the controller in response to the calculated flow of intermediate reformate. Where a product sensor is present downstream from the purification unit for sensing the hydrogen-enriched reformate and/or hydrogen-depleted reformate, the product valve can be operated at least in part in response to sensed product data. Control over the flow of hydrogen-enriched reformate out of the purification unit can be used to create back-pressure within the purification unit to maintain a more stable or fixed pressure within the purification unit. Further, such control also provides additional control over the flow rate of reformate through the purification unit for purposes of maintaining the composition of the hydrogen-enriched reformate.

An apparatus of the present invention can optionally include a storage unit disposed downstream of the purification unit for storing a hydrogen-enriched reformate. A compression unit can optionally be included for producing a flow of compressed hydrogen-enriched reformate for storage depending on the pressure requirements of the particular storage unit selected. Moreover, a second conduit can be included that is capable of providing a controlled flow of supplemental fluid to an inlet of the second compression unit. The second conduit preferably has an inlet disposed intermediate the second compression unit and the storage unit, a valve for controlling the flow of supplemental fluid through the conduit, and an outlet disposed intermediate an outlet of the purification unit and the inlet to the second compression unit.

Storage units suitable for use in an apparatus of the present invention can be selected from hydrogen storage devices that are known in the art. Preferably, the hydrogen storage device will comprise a storage vessel suitable for containing the hydrogen-enriched reformate in a desired form, including but not limited to, pressurized gas, liquefied gas or solid. Suitable storage vessels can be portable, modular, skid mounted or fixed in place. Further, a selected storage unit preferably has sufficient storage capacity to enable the unit to deliver stored reformate to an outlet at a selected rate during periods in which the fuel processor is not operating and/or during periods of peak demand when the volume of reformate produced by the fuel processor must be supplemented to meet demand.

The hydrogen storage unit may comprise a high pressure vessel operably connected in fluid communication with a compression unit for storing a compressed product. Suitable storage units can also utilize hydrogen-fixing material(s) that can reversibly fix hydrogen. Hydrogen-fixing materials are known in the hydrogen storage art and can include activated carbon, carbon composites, fullerene-based materials, metal hydrides, alloys of titanium, vanadium, chromium and manganese, with or without additional elements, magnetic hydrogen-absorbing material, and nanostructures formed from light elements selected from the second and third rows of the periodic table. Examples of vessels containing hydrogen-fixing material for storing compressed hydrogen are described in U.S. Pat. No. 4,598,836 issued Jul. 8, 1986 to Wessel and U.S. Pat. No. 6,432,176 B1 issued Aug. 13, 2002 to Klos et al., the disclosures of which are incorporated herein by reference. In still other embodiments, the storage unit can comprise a liquefaction unit capable of converting the hydrogen-rich product to a liquefied product through cryogenic cooling or other liquefaction techniques.

An apparatus of the present invention can optionally include one or more sensors disposed throughout the apparatus for sensing the temperature, composition, density, pressure and/or flow rate of fluids at various locations within the apparatus. Those skilled in the art will appreciate that sensed data such as temperature and pressure can be used to calculate other fluid conditions such as density using methods such as those described in U.S. Pat. No. 6,619,336 issued Sep. 16, 2003 to Cohen et al. In addition, sensed compositional information can be used for a variety of purposes including estimating the hydrogen concentration of the product as is described in U.S. Pat. No. 6,770,391 B2 issued Aug. 3, 2004 to Nelson et al. Sensors for sensing and monitoring the apparatus and fluid conditions of temperature, composition, pressure and flow rate are known and commercially available.

In a process aspect of the present invention, a method for producing a hydrogen-enriched reformate is provided. The method includes producing a flow of intermediate reformate that comprises hydrogen and an impurity in a fuel processor. A process for producing an intermediate reformate in a fuel processor is described in detail above. Impurity is removed from the intermediate reformate in a purification unit to produce a hydrogen-enriched reformate. A calculated flow of intermediate reformate to be produced by the fuel processor is determined from a process model of the fuel processor and the purification unit is operated, at least in part, in response to the calculated flow of intermediate reformate.

Impurity can be removed from the intermediate reformate through selective adsorption, and in particular, through the use of a pressure swing adsorption unit as is described above. Impurity is removed by directing the flow of intermediate reformate through one or more of a plurality of adsorbent beds for an adsorption period. The removal of impurity from a flow of intermediate reformate in a pressure swing adsorption unit depends on the flow rate and composition of the intermediate reformate as well as the pressure within the purification unit. Typically, the flow of intermediate reformate from the fuel processor to the adsorbent beds of the purification unit is between about 150 slpm and about 370 slpm, where standard units represent 25° C. at 1 atm. The composition of the intermediate reformate can vary but will typically include $CO<1\%$, $CH_4<2\%$, $CO_2>15\%$ and $H_2>40\%$. Moreover, the pressure within the purification unit is typically between about 70 psig and about 350 psig and is preferably fixed while the purification unit is removing impurity from the reformate. When the purification unit is properly adjusted, a hydrogen-enriched reformate having a hydrogen concentration of at least about 99.90% by volume, can be produced at a rate of between about 40 slpm and about 120 slpm.

The purification unit can be operated in response to the calculated flow of intermediate reformate by adjusting the adsorption period in response to the calculated flow of intermediate reformate. The purification unit preferably comprises a valve assembly capable of selectively controlling the flow of intermediate reformate to the plurality of adsorbent beds and a variable speed motor for creating rotation between the valve assembly and the plurality of adsorbent beds. In such an embodiment, the adsorption period can be adjusted by changing the speed of the motor. The speed of the motor for producing a hydrogen product having the desired purity and flow rate is design specific. In the case of a Questair H3200 series PSA, the speed of the variable speed motor is preferably selected and adjusted within a range between about 3 to about 11 rpm to achieve the composition and flow rates noted above.

Removal of impurity preferably utilizes a plurality of adsorbent beds so that flow through a first adsorbent bed can be interrupted and re-directed through a second adsorbent bed to continue the removal of impurity and the production of a flow of hydrogen-enriched reformate. Further, the interruption of flow through the first adsorbent bed and its re-direction enables the first adsorbent bed to be regenerated by one or more of depressurizing, purging, heating, cooling and re-pressurizing the bed and the adsorbent materials therein. Regeneration of an adsorbent bed favors the release of adsorbed impurities produces a flow of exhaust or a hydrogen-depleted product comprising the previously adsorbed impurities.

As described above, a process model of the fuel processor is used to determine a calculated flow of intermediate reformate. The calculated flow of intermediate reformate can include the flow rate and composition of the intermediate reformate that will be produced by the fuel processor. Moreover, the calculated flow of intermediate reformate can be determined from a feed(s) to the fuel processor or determined from a selected hydrogen-enriched reformate output. Thus, the method can further include selecting a feed to the fuel processor for use in determining the calculated flow of intermediate reformate. In other embodiments, the method can further include selecting a hydrogen-enriched reformate output for use in determining the calculated flow of intermediate reformate needed to produce the selected hydrogen-enriched reformate output. Selection of the hydrogen-enriched reformate output can include a composition and/or a flow rate input.

By way of example, an operator can select the hydrogen-enriched reformate output to be produced. The selected hydrogen-enriched reformate output is used by the controller to determine the calculated flow of intermediate reformate to be produced by the fuel processor. A process model of the purification unit or empirical correlations as described above can be used to determine the calculated flow of intermediate reformate. The process model of the fuel processor and the calculated flow of intermediate reformate are used by the controller to set and adjust the feeds to the fuel processor to produce intermediate reformate. When the fuel processor reaches a steady state, the flow of intermediate reformate is directed to the purification unit to produce the hydrogen-enriched reformate. The calculated flow of intermediate reformate and a look-up table can be used by the controller to set and adjust the operation of the purification unit to produce a hydrogen-enriched reformate having the desired purity and flow rate. In other embodiments, the operator selects a feed or set of feeds to the fuel processor and the controller determines the calculated flow of intermediate reformate therefrom. The calculated flow of intermediate reformate can then used by the controller to set and adjust other feeds to the fuel processor and the operation of the purification unit to produce a hydrogen-enriched reformate of desired purity.

The method of the present invention further includes operating the purification unit in response to the calculated flow of intermediate reformate. As changes occur in the flow rate or composition of the intermediate product, adjustments in the operation of the purification unit can be made by the controller to maintain the composition of the hydrogen-enriched reformate. More specifically, the adsorption period can be adjusted to maintain hydrogen purity. By way of example, when the fuel processor is turned down because of decreased hydrogen demand or for other reasons, changes in the composition and/or flow rate of the intermediate reformate occur. Such changes are reflected in changes in the calculated flow of intermediate reformate as well. In a method of the present invention, the operation of the purification unit can be adjusted by increasing or decreasing the speed of the variable speed motor to compensate for changes in the calculated flow of intermediate reformats. Changes in the speed of the variable speed motor adjust the adsorption period and maintain the composition of the hydrogen-enriched reformate.

Depending on the requirements of a downstream purification unit, the flow of intermediate reformats can optionally be compressed to produce a flow of compressed intermediate reformate prior to removing impurity therefrom. In such an embodiment, the intermediate reformate can be compressed in a compressor driven by a fixed or variable speed motor for delivery to the purification unit. In a preferred embodiment, the purification unit is operated independent of the speed of the compressor. Where the hydrogen-enriched reformate is optionally stored in a storage unit that requires the product gas to be stored at an elevated pressure, the flow of hydrogen-enriched reformate from the purification unit can be compressed as well.

The intermediate reformate can have fluctuations in composition, pressure and/or flow rate. These fluctuations can optionally be reduced or dampened by buffering the intermediate reformate in a buffer upstream from the purification unit. In embodiments where the intermediate reformate is compressed prior to delivery to a purification unit, fluctuations of pressure and/or flow rate can be reduced by providing a controlled flow of a supplemental fluid to an inlet of the compression unit. The supplemental fluid can comprise compressed intermediate reformate and/or hydrogen-enriched reformate and control over the flow can be provided by a variable opening valve. The flow of supplemental fluid to the inlet of the compression unit can be controlled in response to the calculated flow of intermediate reformate and/or in response to a sensed pressure and/or flow rate of intermediate reformate proximate the inlet of the compression unit.

The hydrogen-enriched reformate and/or a hydrogen-depleted reformate can optionally be sensed to generate sensed product data. The hydrogen-enriched reformate or hydrogen-depleted reformate is sensed downstream proximate the purification unit so that sensed data indicative of changes in the hydrogen-enriched reformate composition is detected and compensatory action can be taken quickly. The sensed product data can include temperature, pressure, density, flow rate, and/or compositional data. Where the hydrogen-enriched reformate is optionally stored in a storage unit, the hydrogen-enriched reformate is sensed upstream from the storage unit so that off-specification reformate can be diverted before it is received by the storage unit.

A method of the present invention can optionally include controlling the flow of hydrogen-enriched reformate out of the purification unit. The flow of hydrogen-enriched reformate out of the purification unit can be controlled by a variable-opening product valve. This valve can be controlled in response to the calculated flow of intermediate reformate and/or in response to sensed product data generated by a product sensor as described above. Control over the flow of hydrogen-enriched reformate out of the purification unit can be used to create back-pressure within the purification unit to maintain a more stable or fixed pressure within the purification unit. Further, such control also provides additional control over the flow of reformate through the purification unit for purposes of maintaining the composition of the hydrogen-enriched reformate.

DETAILED DESCRIPTION OF THE FIGURES

As illustrated in FIG. 1, hydrogen producing apparatus 100 includes fuel processor 110, purification unit 140 and controller 170. Fuel processor 110 includes oxidizer 113 and reformer 111, with the fuel processing reactants delivered to the processor through feed 102. The nature of the fuel processor will determine the number and nature of feeds. For instance, the feed will include conduits for delivering reactants such as fuel, oxidant, and optionally water or steam, depending on the nature of the fuel processing reaction(s) to be performed. As illustrated, fuel 101, air 103 and water 105 are provided to feed 102 for delivery to the fuel processor. The reactants are converted within fuel processor 110 to a flow of intermediate reformate that includes hydrogen and one or more impurities. The flow of intermediate reformate from the fuel processor can have fluctuations in pressure, flow rate and/or composition, both during transient and steady state operations.

The flow of intermediate reformate is directed from fuel processor 110 to purification unit 140 via line 112. Purification unit 140 uses selective adsorption to remove impurities from the intermediate reformate by directing the intermediate reformate through a bed(s) of adsorbent material(s) that preferentially adsorb impurities and allow a product enriched with hydrogen to flow out of the bed. As illustrated in FIG. 1, purification unit 140 is a pressure swing adsorption unit having a plurality of adsorption beds 150 and valve assembly 145. Material flows to each of the plurality of adsorption beds 150 is controlled by valve assembly 145. The purification unit further comprises a variable speed motor 141 for creating rotation between valve assembly 145 and adsorbent beds 150. The configuration of valve assembly 145 and the speed of variable speed motor 141 determine the operational phase of an adsorbent bed and the rate at which each bed progresses through a cycle of adsorption and regeneration. During such a cycle, an adsorption bed can receive a flow of intermediate reformate, a flow of purge gas, can be depressurized, evacuated, heated, cooled and/or re-pressurized among other possible operations. It should also be noted that sources and sinks for pressurization, purge gases and the like, as well as details concerning valve assembly 145 have not been illustrated in FIG. 1 so as not to obscure the invention.

During operation, the intermediate reformate is directed into the purification unit through valve assembly 145 and flowed through one or more of adsorbent beds 150 for an adsorption period. The length of the adsorption period is determined by the configuration of the valve assembly 145 and the speed of motor 141. During an adsorption period, impurities within the flow of intermediate reformate are adsorbed by the adsorbent materials within the bed(s) and the flow of hydrogen-enriched reformate is directed out of the purification unit through line 142. As noted herein, the purity of the hydrogen-enriched reformate can depend on a number of factors including the type of adsorbent material, the configuration and geometries of the bed, the flow rate of intermediate reformate, as well as pressure and temperature conditions. For a given bed and adsorbent material, the length of the adsorption period will have a direct bearing on the purity of the hydrogen-enriched reformate and may be adjusted to manipulate the purity of the hydrogen-enriched reformate or to compensate for fluctuations in the pressure, flow rate and/or composition of the intermediate reformate produced by fuel processor 110.

Controller 170 is provided for monitoring and controlling the operation of fuel processor 110 and purification unit 140. In addition, sensors (not illustrated) are provided for sensing the reactants to be delivered to fuel processor 110. Reactant data generated by such sensors is relayed to controller 170 as indicated by broken lines A, B and C, respectively. Controller 170 includes a process model of fuel processor 110. Reactant data is input into the process model to determine a calculated flow of intermediate reformate that is expected to be produced by fuel processor 110 from reactants 101, 103 and 105. Input/ouput device 171 is provided for selecting one or more feeds to be delivered to the fuel processor and/or a hydrogen-enriched reformate output to be produced by apparatus 100 for use in determining the calculated flow of intermediate reformate. Based on the calculated flow of intermediate reformate, which can include composition, pressure and/or flow rate data for the flow of intermediate reformate, controller 170 determines the appropriate adsorption period for purification unit 140. An instruction setting and/or adjusting the speed of motor 141 is relayed to the motor, as indicated by broken line D. In this manner, controller 170 operates purification unit 140 in response to the calculated flow of intermediate reformate and is able to adjust the adsorption period to compensate for changes in the reformate produced by fuel processor 110 that could otherwise negatively impact the purity of the hydrogen-enriched reformate.

Figure 2:
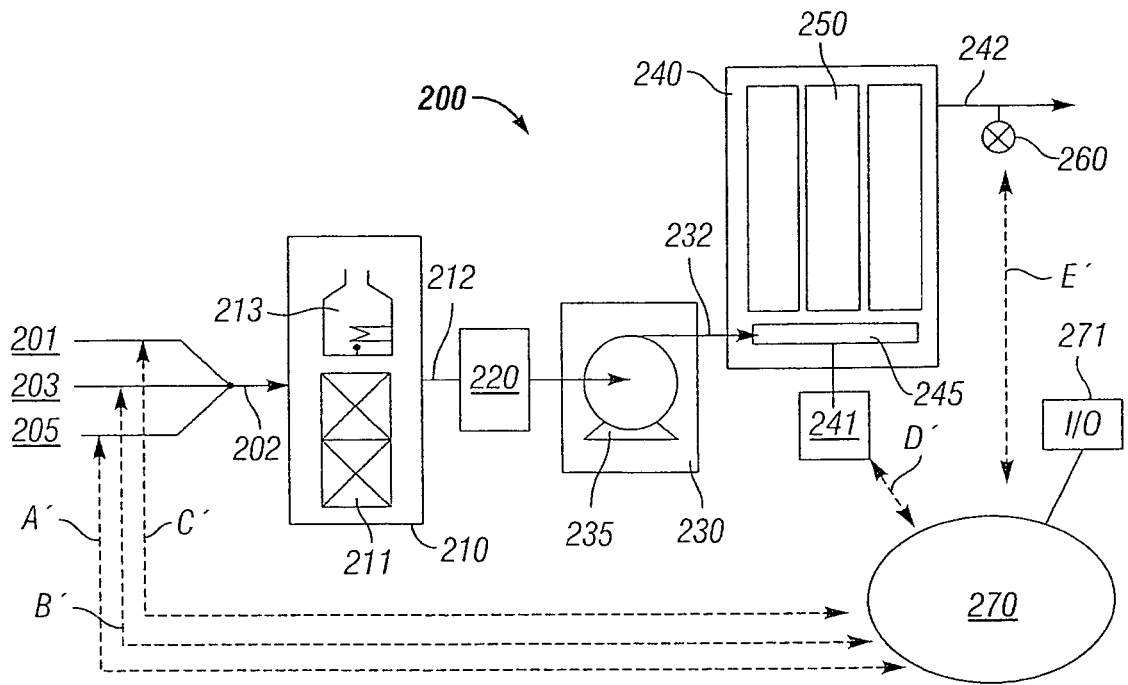
FIG. 2 is a schematic illustration of an embodiment of the present invention comprising a fuel processor and a purification unit.

FIG. 2 illustrates an embodiment 200 of the present invention wherein the apparatus comprises fuel processor 210 having oxidizer 213 and reformer 211. Feed 202 delivers a fuel 201, oxidant 203 and water 205 for reforming in the fuel processor 210. The intermediate reformate produced in fuel processor 210 is directed to buffer 220 via line 212, and then to compression unit 230 via line 222. The flow of intermediate reformate is compressed within compression unit 230 by compressor 235 prior to being directed to purification unit 240. Purification unit 240 is not unlike the purification unit illustrated in FIG. 1, having a plurality of adsorbent beds 250, a valve assembly 245 and a variable speed motor 241 for creating rotation between the adsorbent beds and the valve assembly.

Product sensor 260 is positioned downstream of the purification unit for sensing the hydrogen-enriched reformate flowing out of the purification unit through line 242 and generating sensed product data. The sensed product data can include compositional information concerning the hydrogen-enriched reformate. The sensed product data is relayed to controller 270 for determining if the hydrogen-enriched reformate is within specification limits. Moreover, the sensed product data can be used by controller 270 to determine the accuracy of the process model of fuel processor 210 for determining a calculated flow of intermediate reformate, and when needed, to modify the process model so as to determine a more accurate calculated flow of intermediate reformate.

Controller 270 monitors and controls the operation of fuel processor 210, buffer 220, compression unit 230, and purification unit 240. Reactant data is relayed to controller 270 as indicated by broken lines A', B' and C' for input into the process model of fuel processor 210 for determining a calculated flow of intermediate reformate. Sensed product data from product sensor 260 is relayed to controller 270 as indicated by broken line E'. Input/ouput device 271 is provided for selecting one or more feeds to be delivered to the fuel processor and/or a hydrogen-enriched reformate output to be produced by apparatus 200 for use in determining the calculated flow of intermediate reformate. Based on the calculated flow of intermediate reformate and the sensed product data, controller 170 determines the appropriate adsorption period for purification unit 240. An instruction that sets and/or adjusts the speed of motor 241 is relayed to the motor, as indicated by broken line D'.

Figure 3:
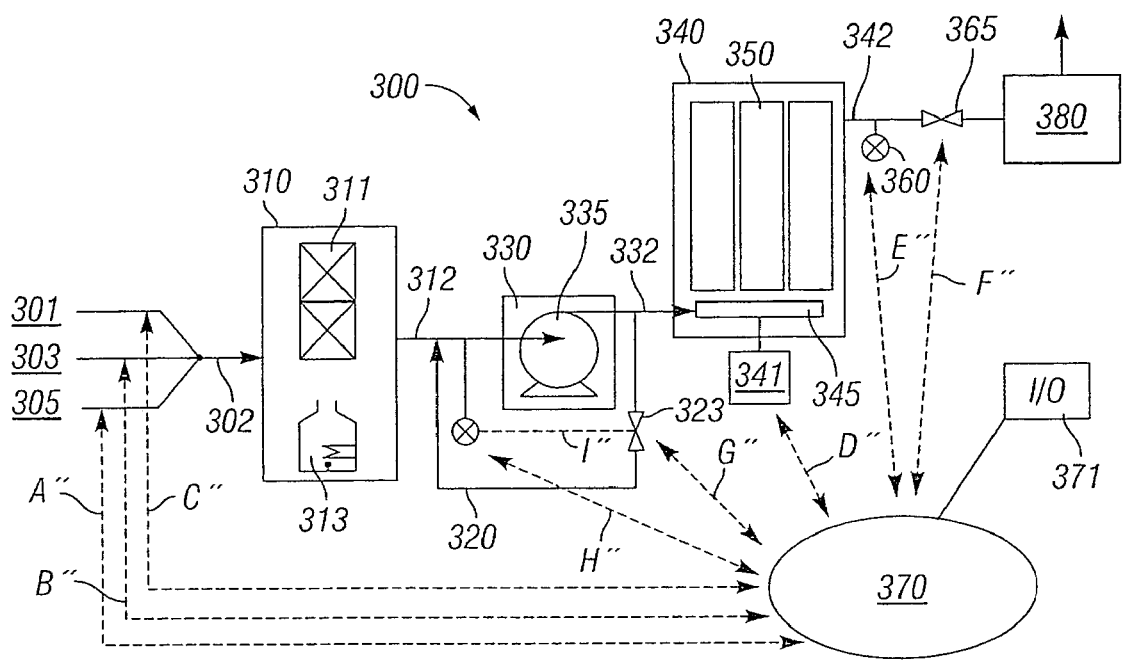
FIG. 3 is a schematic illustration of an embodiment of the present invention comprising a fuel processor and a purification unit.

The embodiment 300 illustrated in FIG. 3 includes fuel processor 310, compression unit 330, purification unit 340, tank 380 and controller 370. As illustrated, feed 302 delivers a fuel 301, oxidant 303 and water 305 for reforming in the fuel processing unit 310. Fuel processor 310 includes an oxidizer 313 wherein fuel and oxidant are pre-heated and water is converted to steam. The fuel processor also includes a reforming reactor 311 wherein the pre-heated reactants are converted to an intermediate reformate comprising hydrogen and one or more impurities.

As noted herein, a flow of intermediate reformate from fuel processor 310 can have variations or fluctuations in composition, pressure and/or flow rate. To reduce such fluctuations, conduit 320 having inlet 321 and variable-opening valve 323 are provided for directing a controlled flow of compressed intermediate reformate to line 312. Sensor 325 is provided upstream of compression unit 330 for sensing the pressure and/or flow rate of intermediate reformate in line 312. Sensed pressure and/or flow rate data from sensor 325 can be relayed directly to variable-opening valve 323, as indicated by broken line I'', for use in controlling the position of valve 323. In an alternative, the sensed data can be relayed to controller 370 for use in operating valve 323, as indicated by broken lines H'' and G''. A flow of compressed intermediate reformate to line 312 via conduit 320 serves to dampen fluctuations in the pressure and/or flow rate of the intermediate reformate delivered to the compression unit and prevents the formation of a vacuum within line 312 that might otherwise draw and mix atmospheric gases with the intermediate reformate.

The intermediate reformate produced in fuel processor 310 is directed to compression unit 320 via line 312. The compression unit receives the intermediate reformate and produces a flow of compressed intermediate reformate that is directed to purification unit 330 through line 332. Purification unit 330 has a plurality of adsorbent beds 350, a valve assembly 345 and a variable speed motor 341 for creating rotation between the adsorbent beds and the valve assembly. The operation of purification unit 330 is similar to the operation of the purification units illustrated in FIG. 1 and FIG. 2. Product sensor 360 is positioned downstream of the purification unit for sensing the hydrogen-enriched reformate flowing out of the purification unit through line 342. The sensed product data is relayed to controller 370 as indicated by broken line B'. Product valve 365, a variable-opening valve, is disposed in line 342 for controlling the flow of hydrogen-enriched reformats out of the purification unit. Tank 380 is provided downstream from the purification unit and product sensor 360 for receiving and storing the hydrogen-enriched reformate, at least temporarily, prior to dispensing or further processing.

Controller 370 monitors and controls the operation of fuel processor 310, compression unit 330, and purification unit 340. Reactant data is relayed to controller 370 as indicated by broken lines A'', B'' and C'' for input into the process model of fuel processor 310 for determining a calculated flow of intermediate reformate. Input/ouput device 371 is provided for selecting one or more feeds to be delivered to the fuel processor and/or a hydrogen-enriched reformate output to be produced by apparatus 300 for use in determining the calculated flow of intermediate reformate. Sensed product data from product sensor 360 is relayed to controller 370 as indicated by broken line E''. The pressure and/or flow rate of intermediate reformate as sensed by sensor 325 is relayed to controller 370 as indicated by broken line H''. Controller 370 controls or operates variable opening valve 323 in response to the calculated flow of intermediate reformate and the pressure and/or flow rate of intermediate reformate as sensed by sensor 325. An instruction that sets and/or adjusts the opening of valve 323 is relayed to the valve, as indicated by broken line G''. Controller 370 determines the appropriate adsorption period for purification unit 340 in response to the calculated flow of intermediate reformate and the pressure and/or flow rate of intermediate reformate as sensed by sensor 325 and/or the sensed product data from product sensor 360. An instruction that sets and/or adjusts the speed of motor 341 is relayed to the motor, as indicated by broken line D''. Controller 370 controls or operates variable opening valve 323 in response to the calculated flow of intermediate reformate and the pressure and/or flow rate of intermediate reformate as sensed by sensor 325 and/or the sensed product data from product sensor 360. An instruction that sets and/or adjusts the opening of valve 363 is relayed to the valve, as indicated by broken line F''.

Figure 5:
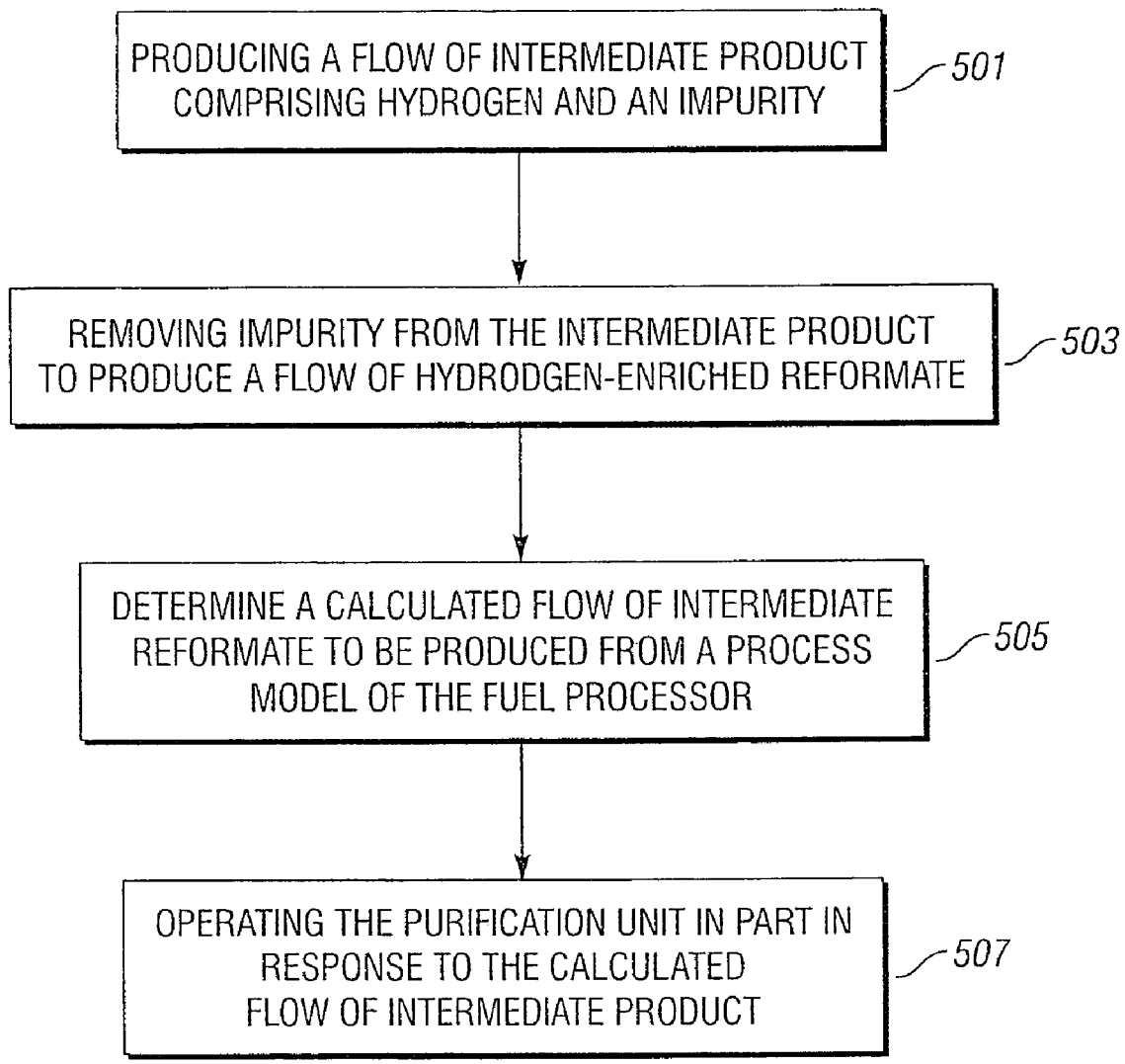
FIG. 5 is a block diagram of a method of the present invention.

FIG. 4 is block diagram illustrating various process steps in a fuel processor capable of producing a flow of intermediate reformate. The steps illustrated in FIG. 4 were described in detail above and are not repeated here. FIG. 5 is a block diagram illustrated the steps of a method for generating a hydrogen-enriched reformate from a flow of intermediate reformate comprising hydrogen and an impurity. The steps of the method are described in detail above and are not repeated here.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for producing hydrogen comprising:
   a fuel processor for producing a flow of intermediate reformate comprising hydrogen and an impurity;
   a purification unit disposed downstream of the fuel processor for removing impurity from the flow of intermediate reformate to produce a flow of hydrogen-enriched reformate;
   a controller for determining a calculated flow of intermediate reformate from a process model of the fuel processor and operating the purification unit in part in response to the calculated flow of intermediate reformate.

2. The apparatus of claim 1, wherein the fuel processor comprises an oxidizer and a reformer.

3. The apparatus of claim 1, wherein the purification unit comprises a plurality of adsorbent beds and a valve assembly for selectively controlling the flow of intermediate reformate to one or more of the plurality of adsorbent beds.

4. The apparatus of claim 3, wherein the plurality of adsorbent beds comprises an adsorbent material for selectively adsorbing impurity from the flow of intermediate reformate.

5. The apparatus of claim 3, wherein the purification unit comprises a variable-speed motor for creating rotation between the valve assembly and the plurality of adsorbent beds.

6. The apparatus of claim 1, further comprising a product sensor disposed downstream of the purification unit for sensing the hydrogen-enriched reformate and/or a hydrogen-depleted reformate to generate sensed product data, and wherein the controller operates the purification unit in part in response to the sensed product data.

7. The apparatus of claim 1, further comprising a product valve downstream of the purification unit for controlling the flow of hydrogen-enriched reformate out of the purification unit, the product valve comprising a variable opening valve operated in part in response to the calculated flow of intermediate reformate.

8. The apparatus of claim 1, further comprising a compression unit disposed downstream from the fuel processor, the compression unit for receiving the flow of intermediate reformate and producing a flow of compressed intermediate reformate for delivery to the purification unit.

9. The apparatus of claim 8, wherein the compression unit comprises a variable or fixed speed compressor and wherein the controller operates the purification unit independent of the speed of the compressor.

10. The apparatus of claim 8, further comprising a conduit having a variable opening valve for controlling a flow of supplemental fluid through the conduit to an inlet of the compression unit and wherein the controller operates the variable opening valve in part in response to the calculated flow of intermediate reformate.

11. The apparatus of claim 8, further comprising a sensor disposed upstream of the compression unit for sensing the pressure and/or flow rate of the intermediate reformate, and wherein the variable opening valve is operated in response to a sensed pressure and/or flow rate.

12. The apparatus of claim 11, and wherein the controller operates the purification unit in part in response to the sensed pressure and/or flow rate.

13. The apparatus of claim 1, further comprising a buffer disposed intermediate the fuel processor and purification unit for buffering the flow of intermediate reformate.

14. The apparatus of claim 1, further comprising a tank disposed downstream from the purification unit capable of receiving and storing the hydrogen-enriched reformate.

15. The apparatus of claim 1, further comprising a feed to the fuel processor comprising a fuel, air, water and mixtures thereof, and a feed sensor for sensing the feed and relaying feed data to the controller.

\* \* \* \* \*